United States Patent Office 3,471,538
Patented Oct. 7, 1969

3,471,538
CYANOALKYLENETIN MERCAPTIDES OR ESTERS AND THE PREPARATION THEREOF
William J. Considine, Somerset, and Gerald H. Reifenberg, Plainfield, N.J., assignors to M & T Chemicals Inc., New York, N.Y., a corporation of Delaware
No Drawing. Filed Jan. 3, 1966, Ser. No. 518,025
Int. Cl. C07f 7/22; A01n 9/12
U.S. Cl. 260—429.7   20 Claims

ABSTRACT OF THE DISCLOSURE

A method is provided for preparing novel organotin mercaptides and organotin esters and the compounds produced by said method by reacting selectively a mercaptan and a carboxylic acid with an organotin charge of the general formula $$\{[NC(CH_2)_m]_nSn(OH)_{r-1}\}_yO_{z-1}$$

where $m$ is a nitrile group of the general formula $$[NC(CH_2)_m]-$$

$n$ is an integer 1–3, and $x$, $y$ and $z$ each is 1 or 2. The combination of $n$, $x-1$, $y$, and $z-1$ satisfy a tetravalent and the R in the mercaptan and the carboxylic acid is a hydrocarbon radical. The products of this invention may find applications as biocides and as stabilizers for plastics.

---

This invention relates to tetravalent organotin of the type characterized by the presence of a nitrile group of the general formula:

$$[NC(CH_2)_m]-$$

in which $m$ is an integer at least about 2. More particularly, the invention is concerned with the novel mercaptides and esters of organotins of the aforenamed type and with the methods for preparing the same.

It is an object of this invention to provide novel organotin compounds characterized by the presence of a nitrile group. Another object of this invention is to provide new methods for preparing the present novel compounds. Other objects of this invention will be apparent to those skilled in the art on inspection of the following description.

In accordance with certain of its aspects, the novel process of this invention comprises reacting a compound selected from the group consisting of HSR and HOOCR with an organotin charge of the general formula:

$$\{[NC(CH_2)_m]_nSn(OH)_{z-1}\}_yO_{z-1}$$

in which $m$ has the same meaning as above depicted, $n$ is an integer 1–3, and $x$, $y$ and $z$ each is 1 or 2. The combination of $n$, $x-1$, $y$, and $z-1$ satisfy a tetravalent structure. The R in the mercaptan (HSR) and in the carboxylic acid (HOOCR) may be a hydrocarbon radical. The product thus formed has the general formula:

$$\{[NC(CH_2)_m]_nSn(G)_p\}_qO_{r-1}$$

wherein $m$ and $n$ have the same meaning as stated above, G is —SR or —OCOR group, $p$ is an integer 1–3 and $q$ and $r$ each is 1 or 2. The combination of $n$, $p$, $q$, and $r-1$ satisfy a tetravalent structure.

The mercaptans HSR and the carboxylic acid HOOCR which may be employed in the method of this invention to form respectively the organotin mercaptides and the organotin esters described above may include those in which R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e., having less than about 8 carbon atoms, i.e., octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g., may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Suitable mercaptans that may be used, for example, are methyl mercaptan, butyl mercaptan, amyl mercaptan, n-hexyl mercaptan, 2-ethyl hexyl mercaptan, n-octyl mercaptan, decyl mercaptan, dodecyl mercaptan. Other mercaptans that may be equally suitable include 2-mercaptoethanol, 2(2-mercaptoethoxy)ethanol, 2-ethyl hexyl thioglycolate, isooctyl thioglycolate, 2-mercaptoethyl stearate, 2-mercaptoethyl stearamide, eicosyl mercaptan, benzyl mercaptan, o-, m-, and p-chlorobenzyl mercaptan, 4,4'-diphenylether dithiol, thiophenol, o-, m-, and p-chlorothiophenol, thio-p-cresol, α-thionaphthol, β-thionaphthol, thiophenethiol, mercaptobenzimidazole, thiosalicylic acid, thiocinnamic acid, 2-mercapto methyl benzoate, p-bromothiophenol, p-trifluoromethyl thiophenol. Mixed mercaptans derived from fatty radicals of coconut oil or other natural fatty oils, mercaptans from trimerized isopropylene, mercaptans containing the alkyl radicals of kerosene petroleum fractions, tridecyl mercaptan, oleyl mercaptan, thioabietinol, or other mercaptans derived from the hydrocarbon residues of naval stores products, tall oil, etc., mercaptans derived by conversion to mercaptans of the alcohols produced by the carbon monoxide-hydrogen synthesis, or the mixed alcohols produced by the "oxo" process and mercaptans produced by reductions of the alkyl sulfonic acids resulting from ultraviolet-sulfuryl chloride treatment of paraffins may also be employed in the present invention.

Suitable carboxylic acids that may be used for example, are acetic, propionic, n-butyric, palmitic, stearic, chloroacetic, α-chlorobutyric, methoxyacetic, vinylacetic, benzoic, phenylacetic, lauric, pelargonic, isoctyl, α-naphthoic, oleic, p-chlorobenzoic, phenoxyacetic, cyclohexyl carboxylic, p-methoxybenzoic, m-bromobenzoic, 2-ethylhexanoic, and cyclohexylmaleic acids.

The organotin charge of the general formula $$\{[NC(CH_2)_m]_nSn(OH)_{x-1}\}_yO_{z-1}$$

that may be suitable for the method of this invention may be in the following forms

| | |
|---|---|
| $[NC(CH_2)_m]_3SnOH$ | (I) |
| $\{[NC(CH_2)_m]_2SnOH\}_2O$ | (II) |
| $[NC(CH_2)_m]SnOH$ with =O | (III) |

Preferably the carbon atoms of the polymethylene chain are less than ($m<5$). These three types of organotin-oxygen compounds may be produced by any suitable method. Advantageously, the tris[ω-cyanopolymethylene] hydroxide may be prepared by reacting in an aqueous organic solvent a bromide of the formula $$[NC(CH_2)_m]_3SnBr$$

in which $m$ has the same meanings as above depicted with silveroxide ($Ag_2O$) or thallous oxide ($Tl_2O$). The bis[di-(ω-cyanopolymethylene)hydroxytin]oxide may be prepared similarly by reacting an organotin dibromide of the general formula $$[NC(CH_2)_m]_2SnBr_2$$

with ammonium hydroxide. The reaction may be carried out in an aqueous tetrahydrofuran solution.

In one preferred embodiment of this invention in which the bis[di(ω-cyanopolymethylene)hydroxytin]oxide is reacted with a mercaptan acid, the reaction may be represented by the following equation:

(1) $\{[NC(CH_2)_m]_2SnOH\}_2O + 4HSR$ $\rightarrow 2[NC(CH_2)_m]_2Sn(SR)_2 + 3H_2O$ In another preferred embodiment of this invention in which the bis(oxide) is reacted with a carboxylic acid, the reaction may be represented by the equation:

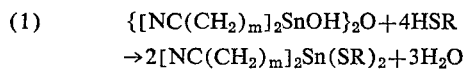

The reaction of bis(oxide) and carboxylic acid yields instead of the normal salt, a corresponding basic salt. The normal salt if formed may be very susceptible to hydrolysis. This may account for the basic salt formation.

In still another preferred embodiment of this invention in which the tris(ω-cyanopolymethylene)tin hydroxide is reacted with a carboxylic acid the reaction may be represented by the equation:

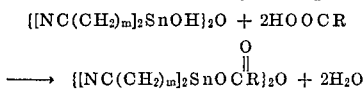

In all these reactions, the reactants used are preferably the stoichiometric amount. There however does not appear to be any critical limitations. An excess of any one of the two reactants in the reaction mixture may not have any detrimental effects. The reactions preferably are carried out in conventional organic solvents such as tetrahydrofuran and benzene and the temperature may be at or below the reflux temperature.

Further to illustrate this invention specific examples are described hereinbelow.

EXAMPLE 1

Preparation of di(2-cyanoethyl)tin bis(isooctyl-mercaptoacetate)

Reaction:

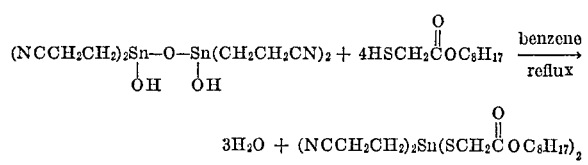

21.8 g. of isooctylthioglycolate, 350 ml. of benzene and 36.7 g. of bis(2-cyanoethylhydroxytin)oxide were added to the flask and heated to reflux with stirring. Reflux was maintained until no more water was collected (90 minutes). A total of 2.3 ml. (95.8% of theory) was collected. Complete solution was obtained upon refluxing. After cooling to room temperature the solution was filtered in order to remove a small amount (0.2 g.) of insoluble material. The filtrate was stripped on a Rinco until no more benzene remained. Di(2-cyanoethyltin) bis isooctylthioglycolate (53.7 g.) was obtained as a clear yellow liquid. Yield was 94.4% of theory. $n_D^{28}=1.5208$. A low tin analysis was obtained so material (45.0 g.) was restripped on a Rinco at 15 mm. and 120° C. pot for two hours. 42.1 g. of product was obtained. $n_D^{28}=1.5215$. Overall yield was 88.4%.

*Analysis.*—Calcd. for $C_{26}H_4N_2O_4S_2Sn$: Sn, 18.76; S, 10.12; N, 4.43. Found (after second stripping): Sn, 17.89; S, 10.27; N, 4.25. Found (after initial stripping): Sn, 17.63; S, 9.96; N, 4.16.

EXAMPLE 2

Preparation of bis[di(2-cyanoethyl)2-ethylhexanoxytin] oxide

Reaction:

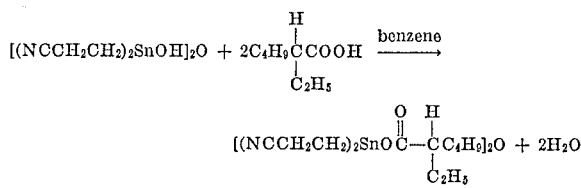

24.3 g. of bis[di(2-cyanoethyl)hydroxytin]oxide, 28.8 g. of 2-ethylhexoic acid and 350 ml. of benzene were heated to reflux (80° C.) until no more water was collected (1.8 ml.~100% $H_2O$). The reaction took about two hours. The product was then recovered by a series of filtration, washing and crystallization. The yield was 62.7%. The product is a white solid, M.P.=154–5° C. (dec.).

*Analysis.*—Calc: Sn, 31.43; N, 7.41; mol. wt. 755. Found: Sn, 32.06; N, 7.69; mol. wt. 730 ($CH_3Cl_3$).

EXAMPLE 3

Preparation of bis[di(2-cyanoethyl)cyclohexylmaleatoxytin]oxide

Reaction:

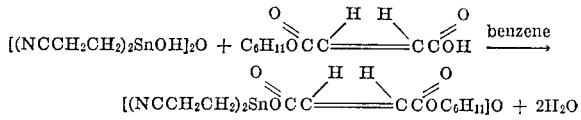

21.8 g. of bis[di(2-cyanoethyl)hydroxytin]oxide 35.6 g. of monocyclohexylmaleic acid and 250 ml. of benzene were heated to reflux (80° C.) until no more water was collected (1.5 ml.~93.8% $H_2O$). A brown solid formed as a ball during reflux and the solution was yellow and cloudy. The reaction took about 2 hours. The product was recovered with 23.4% yield by a series of filtration, washing and crystallization. The product is a white solid, M.P.=161–3° (dec.).

*Analysis.*—Calcd: Sn, 27.50; N, 6.67. Found: Sn, 27.17; N, 6.53.

In a similar experiment the yield was improved to 53.6%.

EXAMPLE 4

Preparation of tris(2-cyanoethyl)tin acetate

Reaction:

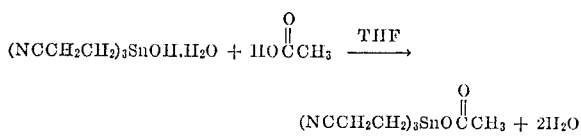

To tris(2-cyanoethyl)tin hydroxide monohydrate (0.05 mole) suspended in tetrahydrofuran was added glacial acetic acid (0.055 mole). The mixture was refluxed for 30 minutes during which time complete solution occurred. After cooling to room temperature, 150 mls. of ethylether was added causing a white solid to precipitate. The weight of white solid was 0.045 mole (90% yield) based on tris(2-cyanoethyl)tin acetate. A mixed melting point of this material with authentic tris(2-cyanoethyl tin acetate did not depress the melting point of the authentic material (M.P. 150–1° C.).

The products of this invention may find applications as biocides and as stabilizers for plastics.

We claim:
1. A method for preparing an organotin compound of the general formula:

$$\{[NC(CH_2)_m]_nSn(G)_p\}_qO_{r-1}$$

in which $m$ is an integer at least about 2, $n$ is an integer 1–3, G is —SR or —OCOR wherein R is selected from the group consisting of alkyl, alkenyl, cycloalkyl, aralkyl, aryl, and alkaryl, $p$ is an integer 1–3, $q$ and $r$ each is 1 or 2, and the combinations of $n$, $p$, $q$, and $r-1$ satisfy the tetravalent structure, which comprises reacting (i) a compound selected from the group consisting of HSR and HOOCR with (ii) an organotin charge of the general formula:

$$\{[NC(CH_2)_m]_nSn(OH)_{x-1}\}_yO_{z-1}$$

in which $x$, $y$ and $z$ each is 1 or 2, and the combinations of $n$, $x-1$ $y$ and $z-1$ satisfy the tetravalent structure, and recovering said organotin.

2. A method for preparing an organotin compound of the general formula:

$$\{[NC(CH_2)_m]_2Sn(G)_p\}_qO_{r-1}$$

in which $m$ is an integer at least about 2, G is —SR or —OCOR wherein R is selected from the group consisting of alkyl, alkenyl, cycloalkyl, aralkyl, aryl, and alkaryl, $p$, $q$ and $r$ each is 1 or 2, and the combinations of 2, $p$, $q$ and $r-1$ satisfy a tetravalent structure, which comprises reacting (i) a compound selected from the group consisting of HSR and HOOCR with (ii) an organotin charge of the general formula:

$$\{[NC(CH_2)_m]_2Sn(OH)_{x-1}\}_yO_{z-1}$$

in which $x$, $y$ and $z$ each is 1 or 2, and the combinations of 2, $x-1$, $y$ and $z-1$ satisfy the tetravalent structure, and recovering said organotin compound.

3. A method according to claim 2 wherein (i) is a mercaptan of the general formula HSR in which R is selected from the group consisting of alkyl, alkenyl, cycloalkyl, aralkyl, aryl, and alkaryl.

4. A method according to claim 3 wherein the mercaptan is

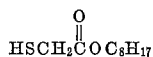

5. A method according to claim 4 wherein $m$ is less than 5.
6. A method according to claim 4 wherein $m$ is 2.
7. A method according to claim 2 wherein (i) is a carboxylic acid of the general formula:

RCOOH in which R is selected from the group consisting of alkyl, alkenyl, cycloalkyl, aralkyl, aryl, and alkaryl.

8. A method according to claim 7 wherein the carboxylic acid is

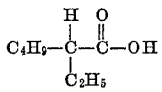

9. A method according o claim 7 wherein the carboxylic acid is monocyclohexyl maleic acid.

10. An organotin compound of the general formula:

$$\{[NC(CH_2)_m]_nSn(G)_p\}_qO_{r-1}$$

in which $m$ is an integer at least about 2, $n$ is an integer 1–3, G is —SR or —OCOR wherein R is selected from the group consisting of alkyl, alkenyl, cycloalkyl, aralkyl, aryl, and arkaryl, $p$ is an integer 1–3, $q$ and $r$ each is 1 or 2, and the combinations of $n$, $p$, $q$ and $r-1$ satisfy the tetravalent structure.

11. An organotin compound of the general formula:

$$\{[NC(CH_2)_m]_2Sn(G)_p\}_qO_{r-1}$$

in which $m$ is an integer at least about 2, G is —SR or —OCOR wherein R is selected from the group consisting of alkyl, alkenyl, cycloalkyl, aralkyl, aryl and alkaryl, $p$ is an integer 1–3, $q$ and $r$ each is 1 or 2, and the combinations of 2, $p$, $q$ and $r-1$ satisfy the tetravalent structure.

12. An organotin compound of claim 10 in which $m$ is less than 5.

13. An organotin compound of claim 12 wherein the general formula is $$[NC(CH_2)_m]_2Sn(SR)_2$$

in which R has the same significance as depicted in claim 12.

14. An organotin compound of claim 12 in which the —SR group is an isooctylthioglycolate radical and the compound has the formula:

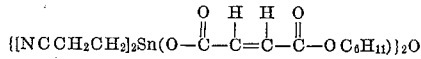

15. An organotin compound of claim 12 wherein the general formula is $$\{[NC(CH_2)_m]_2Sn(OCOR)\}_2O$$

in which R has the same significance as depicted in claim 12.

16. An organotin compound of claim 15 wherein the —OCOR group is a monocyclohexylmaleatoxyl radical and the compound has the formula:

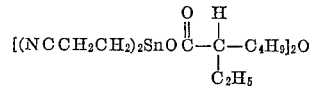

17. An organotin compound of claim 15 wherein the —OCOR group is 2-ethylhexanoxyl radical and the compound has the formula:

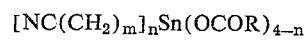

18. An organotin compound of claim 10 wherein the general formula is $$[NC(CH_2)_m]_nSn(OCOR)_{4-n}$$

in which $m$ is less than 5.

19. An organotin compound of claim 18 wherein the —OCOR group is an acetate group and the formula of the compound is $$[NC(CH_2)_m]_3SnOCOCH_3$$

wherein $m$ is an integer 2–4.

20. An organotin compound of claim 19 wherein the $m$ is 2 and the formula of the compound is $$(NCCH_2CH_2)_3SnOCOCH_3$$

References Cited

UNITED STATES PATENTS

| | | | |
|---|---|---|---|
| 2,789,102 | 4/1957 | Weinberg | 260—429.7 X |
| 2,832,751 | 4/1958 | Weinberg et al. | 260—429.7 X |
| 2,977,379 | 3/1961 | Dorfelt et al. | 260—429.7 |
| 3,015,644 | 1/1962 | Leistner et al. | 260—429.7 X |
| 3,053,870 | 9/1962 | Lynn et al. | 260—429.7 |
| 3,209,017 | 9/1965 | Hechenbleikner et al. | 260—429.7 |
| 3,332,970 | 9/1967 | Smith | 260—429.7 |

TOBIAS E. LEVOW, Primary Examiner

W. F. W. BELLAMY, Assistant Examiner

U.S. Cl. X.R.

260—45.75, 999